(12) United States Patent
Nakauchi et al.

(10) Patent No.: US 6,756,593 B2
(45) Date of Patent: Jun. 29, 2004

(54) FLAME SENSOR

(75) Inventors: Shunsaku Nakauchi, Mitaka (JP); Masanori Hirasawa, Tokorozawa (JP)

(73) Assignee: Kokusai Gijutsu Kaihatsu Kabushiki Kaisha, Tokyo (JP)

( * ) Notice: Subject to any disclaimer, the term of this patent is extended or adjusted under 35 U.S.C. 154(b) by 103 days.

(21) Appl. No.: 10/106,410

(22) Filed: Mar. 26, 2002

(65) Prior Publication Data

US 2003/0102434 A1 Jun. 5, 2003

(30) Foreign Application Priority Data

Nov. 30, 2001 (JP) ........................................ 2001-366165
Jan. 24, 2002 (JP) ........................................ 2002-015818

(51) Int. Cl.$^7$ ................................................. G01J 5/02
(52) U.S. Cl. ............................................... 250/339.15
(58) Field of Search ................................... 250/339.15

(56) References Cited

U.S. PATENT DOCUMENTS

| | | | | |
|---|---|---|---|---|
| 4,233,596 A | * | 11/1980 | Okamoto et al. | ............. 340/578 |
| 4,459,484 A | * | 7/1984 | Tar | ........................ 250/338.3 |
| 4,497,373 A | * | 2/1985 | Farquhar | ..................... 169/45 |
| 5,373,159 A | * | 12/1994 | Goldenberg et al. | ... 250/339.15 |
| 5,612,676 A | * | 3/1997 | Plimpton et al. | ............ 340/578 |
| 5,995,008 A | * | 11/1999 | King et al. | .................. 340/578 |
| 6,255,651 B1 | * | 7/2001 | Laluvein et al. | ........ 250/339.15 |
| 6,507,023 B1 | * | 1/2003 | Parham et al. | ......... 250/339.15 |
| 2003/0042420 A1 | * | 3/2003 | Nakauchi et al. | ....... 250/339.15 |

FOREIGN PATENT DOCUMENTS

| | | | |
|---|---|---|---|
| JP | A-50-2497 | 8/1973 | |
| JP | A-53-44937 | 2/1976 | |
| JP | A-59-32095 | 8/1982 | |
| JP | A 59-079123 | 10/1982 | |
| JP | A 61-076922 | 9/1984 | |
| JP | A 04-227599 | 4/1991 | |
| JP | A 10-326391 | 8/1998 | |
| JP | 10326391 A | * 12/1998 | ........... G08B/17/12 |
| JP | A 2000-321132 | 5/1999 | |

* cited by examiner

Primary Examiner—Albert Gagliardi
(74) Attorney, Agent, or Firm—Harness, Dickey & Pierce, P.L.C.

(57) ABSTRACT

A flame sensor comprises a filter which blocks light in an infrared ray region, a filter which blocks stray light, a narrow band filter which passes only light of a band corresponding to a line spectrum of carbonic acid gas resonance radiation generated by a flame, and a broad band filter which passes light of a band which is broader than the band corresponding to the line spectrum, and a plurality of light reception elements which convert lights passing through the narrow and broad band filters to electric signals, the flame sensor judging flame when a difference between intensities of the electric signals is equal to or more than a predetermined value and a ratio between the intensities of the electric signals is within a predetermined range, by assuming that transmission band widths of the narrow and broad band filters are equal, is provided.

19 Claims, 7 Drawing Sheets

FLAME SENSOR

BACKGROUND OF THE INVENTION

1. Field of the Invention

The present invention relates to a flame sensor. More particularly, the present invention relates to a flame sensor capable of detecting a flame in place where solar rays or artificial rays of light such as halogen lamp are present without being affected by such rays of light.

2. Description of the Related Art

To detect a flame, there is a convenient method that detects resonance radiation generated by a high-temperature carbonic acid gas contained in the flame, as is well known in the art. A line spectrum of resonance radiation of the carbonic acid gas includes many wavelengths. To discriminate the line spectrum from ordinary artificial illumination and solar rays, it is appropriate to utilize a spectral line within the range of the infrared region or the ultraviolet region for detecting the flame. Because optical components belonging to the infrared region or the ultraviolet region do not much exist in artificial rays of light such as illumination, so disturbance by external light when sensing a flame is less in these regions.

To detect a flame in the presence of solar rays, a conventional method detects the line spectrum due to resonance radiation of the carbonic acid gas generated by the flame. To discriminate a continuous spectrum, such as solar rays and artificial light, from the line spectrum of the flame, this method compares and computes a plurality of outputs obtained from a monochromatic filter having a narrow-band that permits the passage of only the line spectrum of the flame and from monochromatic filters of a plurality of narrow-bands, which permit the passage of rays of light having one or a plurality of wavelengths, and the method discriminates whether light is the line spectrum of the flame or the continuous spectrum of the solar rays.

Another method utilizes flicker of light generated by the flame and detects the occurrence of the flame.

Among conventional methods that utilize resonance radiation of the carbonic acid gas, the method using the filter requires at least three monochromatic filters to achieve a flame sensor providing a small number of erroneous detections and capable of reliably sensing a flame. In addition, a computation circuit for sensing is complicated, and the flame sensor is unavoidably expensive.

Flame sensors using two or less filters involve the problem that the number of erroneous detections is great. Though economical, flame sensors utilizing the flicker of the flame also involve the problem that the number of erroneous detections is great.

Solar rays, artificial rays or radiation from a stove emit not only visible rays, but also radiation in the infrared regions. However, this radiation is a continuous spectrum. In contrast, the spectrum of resonance radiation of the carbonic acid gas generated by the flame is a line spectrum in which energy concentrates in extremely narrow regions.

Therefore, a flame sensor, using two filters, capable of reliably detecting a flame with equivalent certainty to the conventional flame sensors using three filters, is proposed (JP-A10-326391, JP-A2000-321132). This flame sensor utilizes the difference between the continuous spectrum and line spectrum for detecting the flame.

In this flame sensor, a broad band filter for permitting the passage of light of a band broader than a spectral line of resonance radiation of the carbonic acid gas generated by the flame and a narrow band filter for permitting the passage of only the spectral line of resonance radiation of the carbonic acid gas, are used. Intensity (optical energy) of light from the flame passing through these two filters is divided by the bandwidth of each filter to determine mean intensities.

When the intensity of the spectrum of light passing through the filters is a straight line-like continuous spectrum, energy of the rays of light passing through the two filters is proportional to the transmission bandwidth. Therefore, the mean intensities obtained by dividing this energy by the bandwidth are equal for the two filters.

However, when the rays of light passing through the filters are the line spectrum of resonance radiation of the carbonic acid gas, both of these two filters allow this line spectrum to pass therethrough and transmission energy is substantially equal. However, optical energy of the light passing through the broad band filter is divided by a greater bandwidth to calculate the mean intensity, whereas optical energy of the light passing through the narrow band filter is divided by a smaller bandwidth. Consequently, a difference develops between these two mean intensities.

Therefore, the flame can be detected by judging whether or not a difference between the two mean intensities exceeds a threshold value.

However, size of a flame which can be detected by the flame detecting device is inverse proportional to square of a distance between the flame and the flame detecting device. Therefore, wide dynamic range is needed in order to detect a flame in a wide range, that is, from a flame which is located near the device to a flame which is located far away from the device. Regarding flame detection signal and noise, the same consideration is needed. The above threshold value is set in accordance with a distance between the flame detecting device and a main (target) position to be detected. However, when the threshold value is set in accordance with a position to be detected which is near the device, a level of the flame detecting signal for a flame located far way from the device becomes too small and therefore detection of the flame becomes impossible or detection error rises. In contrast, when the threshold value is set in accordance with a position to be detected which is far away from the device, a level of the noise for a flame located near the device becomes too large and therefore detection error rises. Accordingly, there is a problem that it is difficult to detect a flame precisely in a wide range.

Further, when light having a large amount of energy in the infrared ray region, such as solar rays or artificial rays of light such as halogen lamp, is incident, due to that temperature of a filter in the flame detecting device rises, secondary radiation is generated from the filter, and therefore, detection error rises due to the secondary radiation being noise. Further, when stray light is incident in the flame detecting device, the stray light is incident from a side surface of the filter therefore detection error rises.

SUMMARY OF THE INVENTION

To solve the problems described above, an object of the present invention is to provide a flame sensor that can accurately detect a flame in a wide range.

Also, another object of the present invention is to provide a flame sensor that can detect a flame without error even when stray light or light having large energy in a range of an infrared region such as solar rays or rays from halogen lamp is incident.

A first aspect of the present invention for accomplishing the objects described above is a flame sensor comprising: a narrow band filter for transmitting only light of a band corresponding to a line spectrum of carbonic acid gas resonance radiation generated by a flame; a broad band filter for transmitting light of a band which includes the band corresponding to the line spectrum and which is broader than the band corresponding to the line spectrum; a first light reception element for converting light transmitted through the narrow band filter to a first electric signal; a second light reception element for converting light transmitted through the broad band filter to a second electric signal; and a judging section for determining whether or not a difference obtained by subtracting a value corresponding to an intensity of the second electric signal from a value corresponding to an intensity of the first electric signal is equal to or greater than a predetermined value, and a ratio between the value corresponding to the intensity of the second electric signal and the value corresponding to the intensity of the first electric signal is within a predetermined range, with the value corresponding to the intensity of the second electric signal and the value corresponding to the intensity of the first electric signal being obtained by assuming that the transmission band width of the broad band filter and the transmission band width of the narrow band filter are equal to each other.

The value corresponding to the intensity of the electric signal may be the intensity of the electric signal itself. Also, the value corresponding to the intensity of the electric signal, that is, the value corresponding to the intensity of the second electric signal and the value corresponding to the intensity of the first electric signal may be a moving average value of intensities of electric signals at a range shorter than a predetermined range which is referenced (based) by a moving average value of intensities of electric signals at the predetermined range.

The electric signal converted by the light reception element can be amplified, or it is also possible that the electric signal converted by the light reception element is not amplified. Further, a flicker component of the flame in a range between 1 Hz and 10 Hz superimposed in the electric signal when light of flame is detected is extracted by filtering processing or the like, and the extracted flicker component is used with being amplified or not amplified. Namely, it is possible that the moving average value is calculated on the basis of the flicker component of light of the flame included in electric signal.

When the spectrum of the light passing through the filter is the continuous spectrum, energy of the rays of light passing (transmitted) through the two filters, namely, the energy of the rays of light passing through the broad band filter and the energy of the rays of light passing through the narrow band filter, is substantially proportional to the transmission bandwidth. Therefore, when assuming that a transmission band width of the broad band filter and a transmission band width of the narrow band filter are equal to each other, that is, when the value corresponding to the intensity of the electric signal is converted to a value obtained by assuming that the transmission band widths of the filters are equal to each other, the difference obtained by subtracting the value corresponding to the intensity of the second electric signal from the value corresponding to the intensity of the first electric signal is less than the predetermined value. Causes of the difference being less than the predetermined value include the shape of the intensity distribution of the spectrum of rays of light passing through the filter and the distance between the band centers of the two filters.

In contrast, when only rays of light of a flame are present, the spectrum passing through the broad band filter and the narrow band filter is mainly only the spectral line because the spectrum of the flame is the line spectrum, and energies passing through the broad band filter and the narrow band filter are substantially equal to each other. Therefore, when assuming that the transmission band width of the broad band filter and the transmission band width of the narrow band filter are equal to each other, the value corresponding to the intensity of the first electric signal is greater than the value corresponding to the intensity of the second electric signal.

Accordingly, it is possible to detect a flame by judging whether or not the difference obtained by subtracting the value corresponding to the intensity of the second electric signal from the value corresponding to the intensity of the first electric signal is equal to or greater than the predetermined value, with the value corresponding to the intensity of the second electric signal and the value corresponding to the intensity of the first electric signal being obtained by assuming that a transmission band width of the broad band filter and a transmission band width of the narrow band filter are equal to each other.

When a flame is detected by using only this difference, as described above, detection of a flame becomes impossible or detection error rises if the predetermined value is not set appropriately.

Next, a ratio of values corresponding to intensities of electric signals is considered. When the spectrum of the light passing through the filter is the continuous spectrum, the energy of the rays of light passing through the broad band filter and the energy of the rays of light passing through the narrow band filter is substantially proportional to the transmission bandwidth thereof. Therefore, a ratio of the value corresponding to the intensity of the second electric signal with respect to the value corresponding to the intensity of the first electric signal, or a ratio of the value corresponding to the intensity of the first electric signal with respect to the value corresponding to the intensity of the second electric signal is equal to a ratio of the transmission band widths of the filters.

In contrast, when only the rays of light of the flame are present, as described above, the energy passing through the broad band filter and the energy passing through the narrow band filter are substantially the same. Accordingly, a ratio between the value corresponding to the intensity of the first electric signal and the value corresponding to the intensity of the second electric signal becomes substantially 1. Therefore, a flame can be detected by judging whether or not the ratio between the value corresponding to the intensity of the second electric signal and the value corresponding to the intensity of the first electric signal is within a predetermined range, for example, is between 1 and the ratio of the transmission band widths.

When a flame is detected by using this ratio, precision of the detection becomes worse, calculation for the detection becomes very difficult, or detection error rises if a value corresponding to denominator of the ratio is a extremely small when calculating the ratio.

However, in the first aspect of the present invention, because judging whether or not both conditions of the difference and the ratio described above are satisfied, detection error does not rise, and it is possible to accurately judge whether or not a flame.

A second aspect of the present invention is a flame sensor comprising: a first blocking filter for blocking light in an infrared ray region; a second blocking filter which is disposed at a light transmitted side of the first blocking filter so as to block stray light; a narrow band filter which is disposed at a light transmitted side of the second blocking filter and which transmits only light of a band corresponding to a line spectrum of carbonic acid gas resonance radiation generated by a flame; a broad band filter which is disposed at the light transmitted side of the second blocking filter and which transmits light of a band which includes the band corresponding to the line spectrum, and which is broader than the band corresponding to the line spectrum; a first light reception element for converting light transmitted through the narrow band filter to a first electric signal; and a second light reception element for converting light transmitted through the broad band filter to a second electric signal.

In the second aspect of the present invention, because the first blocking filter which blocks light in an infrared ray region and the second blocking filter which is disposed at a light transmitted side of the first blocking filter so as to block stray light are used, even in a case of that the flame sensor is disposed at a place where solar rays or artificial rays of light such as halogen lamp are present, the flame can be sensed without being affected by the solar rays or the artificial rays of light. Also, detection error due to stray light does not rise.

The first blocking filter which blocks light in an infrared ray region and the second blocking filter which is disposed at a light transmitted side of the first blocking filter so as to block stray light in the second aspect of the present invention can be used in the first aspect of the present invention. As the light reception elements of the first aspect and the second aspect of the invention, lead selenide, a thermopile, or pyroelectric-type light reception element can be used.

A third aspect of the present invention is a flame sensor comprising: a first filter having a predetermined band for transmitting light, a blocking band for blocking only light of a band corresponding to a line spectrum of carbonic acid gas resonance radiation generated by a flame being formed within the predetermined band; a second filter, having a band width substantially the same as that of the predetermined band, for transmitting light of a band including the band corresponding to the line spectrum; a first light reception element for converting light transmitted through the first filter to a first electric signal; a second light reception element for converting light transmitted through the second filter to a second electric signal; and a judging section for determining whether or not a difference obtained by subtracting a value corresponding to an intensity of the second electric signal from a difference which is obtained by subtracting a value corresponding to an intensity of the first electric signal from the value corresponding to the intensity of the second electric signal is equal to or greater than a predetermined value, and a ratio between the value corresponding to the intensity of the first electric signal and the difference is within a predetermined range, with the value corresponding to the intensity of the second electric signal and the value corresponding to the intensity of the first electric signal being obtained by assuming that a blocking band width of the first filter and a transmission band width of the second filter are equal to each other.

A fourth aspect of the present invention is a flame sensor comprising: a first blocking filter for blocking light in an infrared ray region; a second blocking filter which is disposed at a light transmitted side of the first blocking filter so as to block stray light; a first filter having a predetermined band for transmitting light, a blocking band for blocking only light of a band corresponding to a line spectrum of carbonic acid gas resonance radiation generated by a flame being formed within the predetermined band; a second filter having a band width substantially the same as that of the predetermined band, for transmitting light of a band including the band corresponding to the line spectrum; a first light reception element for converting light transmitted through the first band filter to a first electric signal; and a second light reception element for converting light transmitted through the second band filter to a second electric signal.

In the third and the fourth aspects of the present invention, the difference obtained by subtracting the value corresponding to the intensity of the first electric signal from the value corresponding to the intensity of the second electric signal corresponds to the value corresponding to the intensity of the first electric signal, which is obtained from the light transmitting through the narrow band filter which passes only light of the band corresponding to the line spectrum of carbonic acid gas resonance radiation generated by a flame, of the first and the second aspect of the invention. Therefore, by judging whether or not the difference obtained by subtracting the value corresponding to the intensity of the second electric signal from the difference which is obtained by subtracting the value corresponding to the intensity of the first electric signal from the value corresponding to the intensity of the second electric signal is equal to or greater than the predetermined value, and the ratio between the value corresponding to the intensity of the first electric signal and the difference is within the predetermined range, with the value corresponding to the intensity of the second electric signal and the value corresponding to the intensity of the first electric signal being obtained by assuming that the blocking band width of the first filter and the transmission band width of the second filter are equal to each other, the flame can be detected (determined).

As described above, in the first and the third aspects of the present invention, a flame can be detected precisely in a wide range.

In the second and the fourth aspects of the present invention, a flame can be detected precisely even in a case of that the flame sensor is disposed at a place where light having a large amount of energy in the infrared ray region, such as solar rays or artificial rays of light such as halogen lamp, is incident, or stray light is incident.

DESCRIPTION OF THE PREFERRED EMBODIMENTS

A first embodiment of the present invention, which detects a flame by utilizing infrared rays having a wavelength of 4.4 µm emitted by the flame, will be explained initially.

Figure 1:
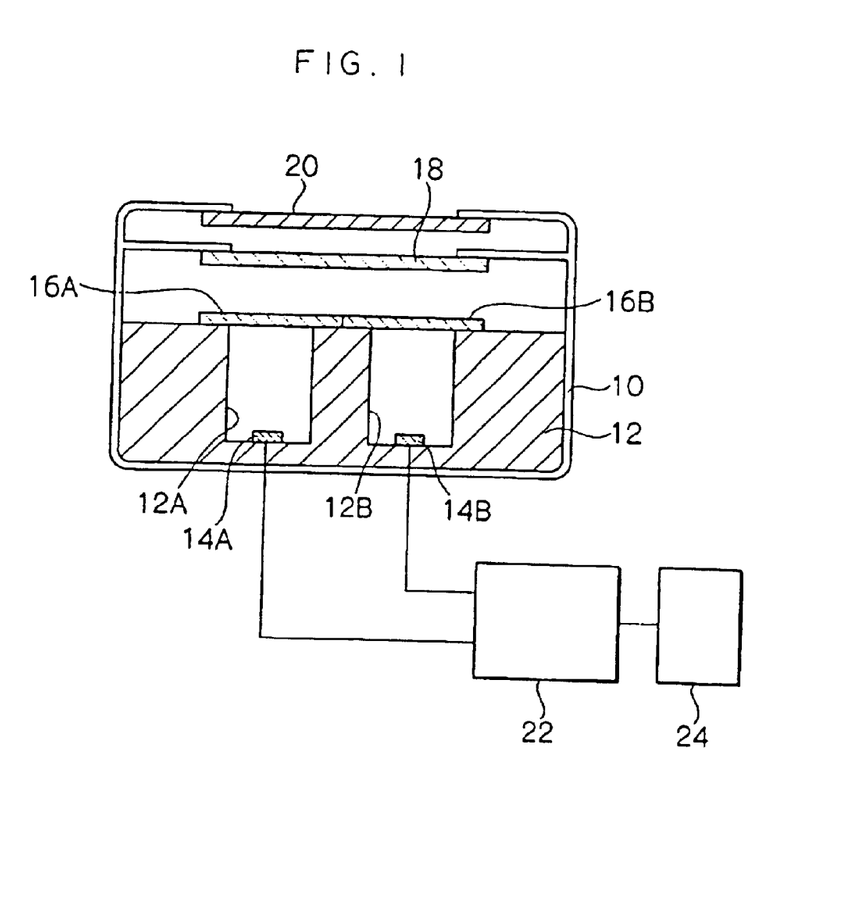
FIG. 1 is a conceptual structural view showing a first embodiment of the present invention.

As shown in FIG. 1, in the first embodiment of the present invention, a case 10 whose upper end is open is provided. A filter holding table 12 is accommodated at a bottom of the case 10. A pair of element accommodating grooves 12A and 12B are formed on the filter holding table 12. Light reception elements (devices) 14A and 14B are fixed by sticking manner or the like on respective bottoms of the element accommodating grooves 12A and 12B.

A narrow band filter 16A, that allows transmission of only rays of light of a spectral line of carbonic acid gas resonance radiation emitted from a flame, is fixed on the filter holding table 12 by sticking manner or the like so as to close the element accommodating groove 12A. Moreover, a broad band filter 16B, whose band contains the spectral line of the carbonic acid gas resonance radiation emitted from the flame, and which allows transmission of rays of light of a broader band than the spectral line, is fixed on the filter holding table 12 by sticking manner or the like so as to close the element accommodating groove 12B.

Further, a first light blocking (shielding) filter 20 for blocking (shielding) light of infrared ray region and a second light blocking filter 18, disposed at a light transmit side of the first light blocking filter 20, for blocking stray light are fixed in order on an opening side of the case 10 by sticking manner or the like such that the first light blocking filter 20 and the second light blocking filter 18 are spaced by a predetermined distance.

Each of the narrow band filter 16A and the broad band filter 16B may be formed by a thin plate made of silicon or germanium which is processed (handled) easily. When the narrow band filter 16A and the broad band filter 16B are formed by thin plates made of silicon or germanium, there is a possibility that a light transmission band which arrows transmission of rays of light having wavelengths more than or equal to 8 µm is formed and the stray light is incident through this light transmission band. Accordingly, it is preferable that the second light blocking filter 18 is formed by a thin plate made of sapphire so as to block the rays of light having wavelengths more than or equal to 8 µm.

The first light blocking filter 20 for blocking light of infrared ray region may be formed by a thin plate made of silicon or germanium, or by a thin plate made of silicon or germanium, on which an antireflection coating (film) is deposited. It is preferable that the first light blocking filter 20 blocks rays of light having wavelengths less than or equal to 2 µm.

As described above, by that the narrow band filter 16A and the broad band filter 16B are formed by the thin plates made of silicon or germanium, the first light blocking filter 20 is formed by the thin plate made of silicon or germanium, and the second light blocking filter 18 is formed by the thin plate made of sapphire, it is possible to structure a small, light in weight and inexpensive flame detecting device.

The light reception elements 14A and 14B are connected to a flame determining device 22. The flame determining device 22 is connected to an alarm circuit 24 that raises an alarm when the flame is determined by the flame determining device 22.

Figure 2:
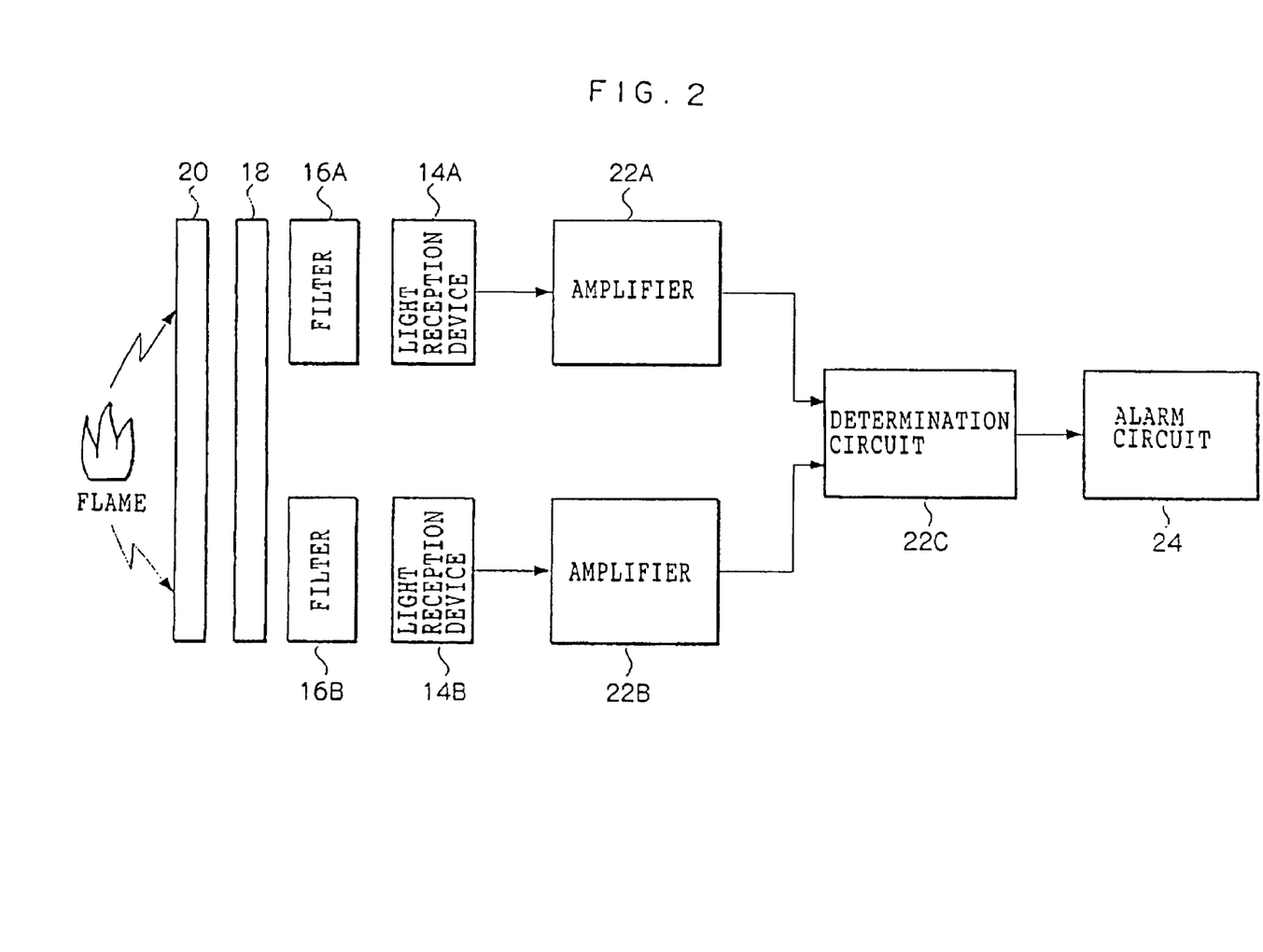
FIG. 2 is a block diagram showing a flame determining device of a first embodiment of the present invention.

As shown in FIG. 2, the flame determining device 22 comprises amplifiers 22A and 22B, and a determining circuit 22C. The amplifiers 22A and 22B amplify electric signals outputted from the respective light reception elements 14A and 14B. The determining circuit 22C determines whether or not a flame by calculation on the basis of the electric signals amplified by each of the amplifiers 22A and 22B. The determining circuit 22C is formed (includes) by a microcomputer.

Figure 3A:
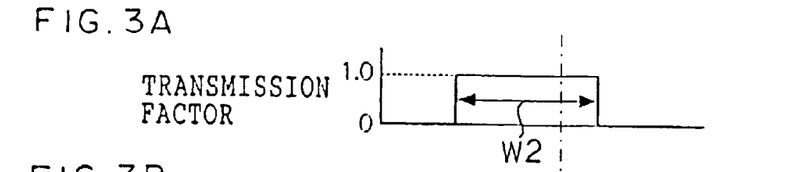
FIG. 3A is a diagram showing a characteristic of a broad band filter used in a first embodiment of the present invention.
Figure 3B:
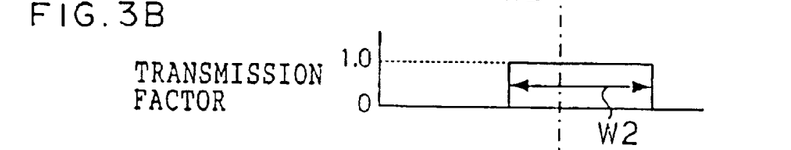
FIG. 3B is a diagram showing a characteristic of another broad band filter used in the first embodiment of the present invention.
Figure 3C:
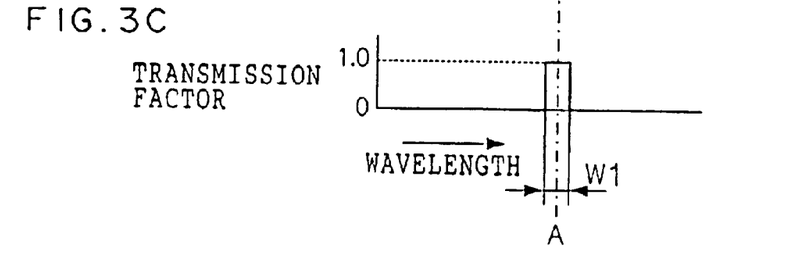
FIG. 3C is a diagram showing a characteristic of a narrow band filter used in the first embodiment of the present invention.

FIG. 3A shows a characteristic of the broad band filter 16B, FIG. 3B shows another characteristic of the broad band filter 16B, and FIG. C shows a characteristic of the narrow band filter 16A. In those figures, x-axis represents wavelength and y-axis represents a transmission factor. Numerical value 0 represents the transmission factor of 0%, and numerical value 1.0 represents the transmission factor of 100%. A symbol W2 represents transmission bandwidth of the broad band filter 16B, and a symbol W1 represents transmission bandwidth of the narrow band filter 16A. A symbol A in FIG. 3C represents a position of the spectral line of resonance radiation of the carbonic acid gas. A band center of the broad band filter 16B and a band center of the narrow band filter 16A are arranged so as not to coincide with each other. Since the band centers are not coincident, the production of the filters is easier than when they are coincident with each other. The value A is 4.4 µm, for example.

As shown in FIGS. 3A and 3B, the broad band filter 16B has a band W2 that includes a band W1 of the spectral line of carbonic gas resonance radiation emitted by a flame, with 4.4 µm which is a wavelength of resonance radiation of the carbonic acid gas as the center, and the band W2 is broader than the band W1.

The narrow band filter 16A has its band center at 4.4 µm and permits transmission of the band W1 containing the spectral line of the resonance radiation of the flame. This filter permits transmission, for example, only from 4.3 µm to 4.5 µm.

The band center of the broad band filter 16B is situated spaced apart by a predetermined wavelength from the wavelength 4.4 µm that is the band center of the narrow band filter 16A. A ratio of the transmission band W2/W1 (=n) is selected so as to be equal to or more than 1.5, generally selected from substantially 5 to 10. The predetermined wavelength is preferably set so as not to deviate from a sensitive range of the light reception element.

In the description of the embodiment described above, the band center of the broad band filter 16B is situated spaced apart by the predetermined wavelength from the band center of the spectral line. However, the present embodiment is not limited to the same. It is possible that the band center of the broad band filter 16B coincides with the band center of the spectral line.

Regarding the light reception elements, it is preferable that the light reception elements has a short response time and a high sensitivity in the wavelength region of infrared rays having wavelength from 3 µm to 5 µm. A relatively economical light reception element suitable for these purpose is lead selenide, a thermopile formed by a thin film formation technique, or pyroelectric-type light reception element.

Figure 5:
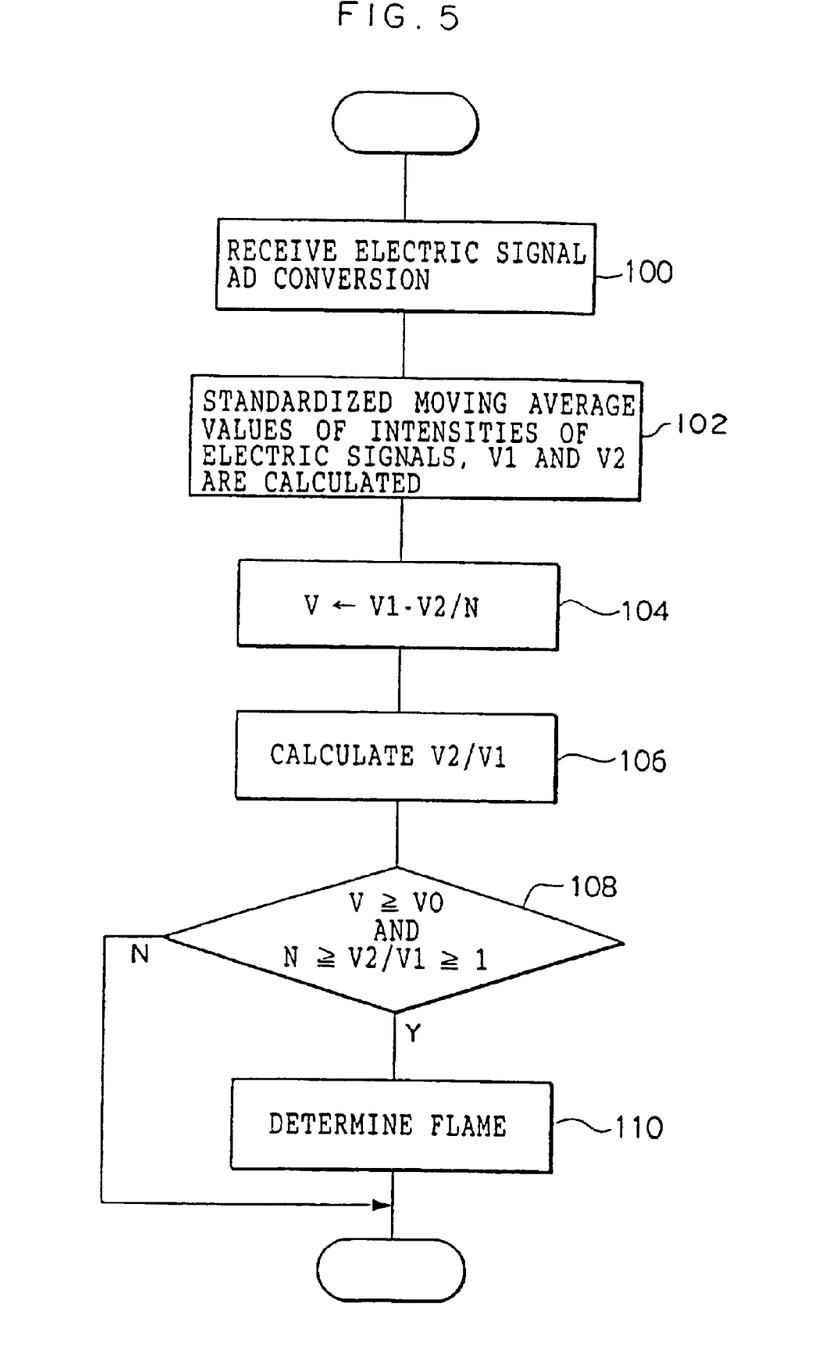
FIG. 5 is a flow chart showing a flame determining routine.

Next, referring to FIG. 5, a flame determining routine by the determining circuit 22C will be explained. First, the light reception element 14A converts the infrared rays transmitted through the broad band filter 16B to electric signal and the light reception element 14B converts the infrared rays transmitted through the narrow band filter 16A to electric signal. One of the two electric signals thus obtained is, through the amplifier 22A, inputted to the determining circuit 22C, and the other of the two electric signals is, through the amplifier 22B, inputted to the determining circuit 22C.

At step 100, the determining circuit 22C receives the electric signals outputted from the light reception elements 14A and 14B, and converts intensities of the electric signals to digital values, respectively.

Actually, the intensities of the electric signals vary due to affection of surrounding temperature or the like as time passes. In order to suppress this affection, at step 102, moving average processing is performed. A moving average value of electric signals at a range (number of samples) which is shorter (smaller) than a predetermined range, which is referenced (standardized) by a moving average value of electric signals at the predetermined range, that is, standardized moving average value, V1 and V2, is calculated as the value corresponding to the intensity of the electric signal.

For example, when the intensities of the electric signals are converted to digital values with 10 samples per second, when moving average value of 8192 samples (range) is calculated, average values for fourteen minutes are obtained sequentially. Therefore, affection of surrounding temperature that varies slowly is suppressed (made small) by the moving average processing of this predetermined range (a long range). This moving average value is a level in which a flame is not detected, that is, a reference level.

On the other hand, when a flame is detected, the intensity of the electric signal varies in a few seconds or scores of seconds. Accordingly, in order to reduce electrical noises, moving average value of a short range which is shorter than the above predetermined range, that is, the moving average value of 1 sample, or 2–8 samples, is calculated. Note that a moving average value of 1 sample (range) corresponds to an intensity of the electric signal itself.

Because the standardized moving average values V1 and V2 are calculated on the basis of the moving average values of long range, they are obtained by subtracting the moving average value of the long range from the moving average value of the short range.

At step 104, the standardized moving average values V1 and V2 are converted to values corresponding to values in a case of that the transmission bands of the broad band filter and the narrow band filter are the same, a difference V is calculated by subtracting the value corresponding to the second intensity of the electric signal (a converted value) from the value corresponding to the first intensity of the electric signal (a converted value).

There is a difference in the standardized moving average values between a case of a continuous spectrum such as artificial light and a case of a line spectrum of a flame for the following reason.

Figure 4:
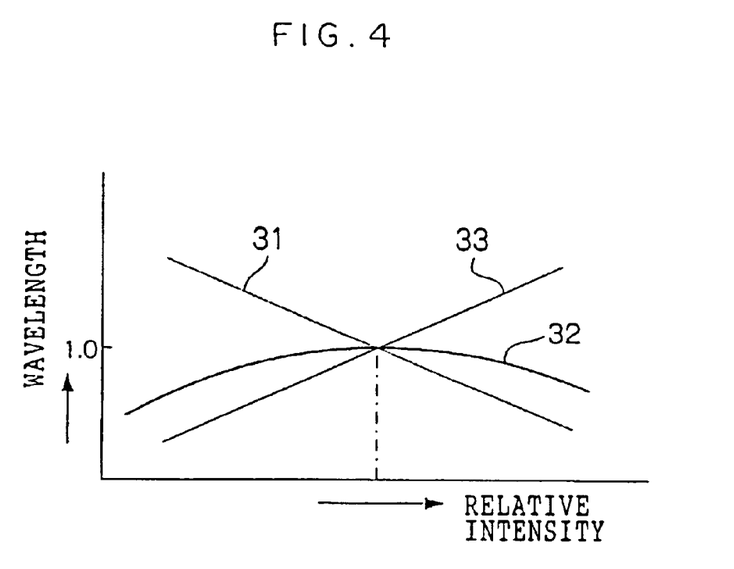
FIG. 4 is a diagram showing a typical example of spectra of radiation members emitting various continuous spectra.

FIG. 4 shows an example of a typical continuous spectrum having wavelengths around 4.4 $\mu$m. Reference numeral 31 in the drawing denotes a spectrum of illumination light such as a lamp, reference numeral 32 denotes a radiation spectrum of a black body around at 400° C. and reference numeral 33 denotes a spectrum of black body radiation at near 200° C. Each spectrum shown in this drawing has a radiation intensity of 1 at 4.4 $\mu$m and intensities at other wavelengths are relative intensities with respect to the former.

As shown in the drawing, the radiation spectrum of the black body at around 400° C. has a peak at a wavelength around 4.4 $\mu$m. This spectrum is a continuous spectrum in which intensity drops a little as wavelength being away from 4.4 $\mu$m, and increases at wavelengths which is smaller than 4.4 $\mu$m (a positive tilt) and decreases at wavelengths which is larger than 4.4 $\mu$m (a negative tilt). The majority of light from the sun or a lamp light source describes a continuous spectrum having a negative tilt. In the case of the continuous spectrum, change of relative intensity with respect to wavelength, that is, tilt, is not so large. Therefore, the intensity of light (radiation) transmitted through the broad band filter 16B and the intensity of light (radiation) transmitted through the narrow band filter 16A is substantially proportional to the transmission bandwidth of each filter. Accordingly, standardized moving average values are substantially equal to each other when assuming that a transmission band width of the broad band filter and a transmission band width of the narrow band filter are equal to each other, for example, a standardized moving average value per unit transmission band width V1/W1 is substantially equal to a standardized moving average value per unit transmission band width V2/W2.

However, when the change of relative intensity with respect to wavelength is great, a difference of standardized moving average values per unit transmission band width, V, becomes greater, in accordance with a gap between the band centers of each of the filters, and, given that Vo is a predetermined value greater than 0, V≧Vo.

Therefore, when the value Vo is optimized, it becomes possible to discriminate whether or not the spectrum is a continuous spectrum.

In contrast, when there is only light from a flame, a spectrum transmitting through the broad band filter and a spectrum transmitting through the narrow band filter is mainly only the spectral line at 4.4 $\mu$m, because the spectrum of the flame is the spectral line, and the quantity of energy transmitted through the broad band filter 16B is substantially equal to the quantity of energy transmitted through the narrow band filter 16A. Accordingly, a standardized moving average value per unit transmission band width of the energy of the spectral line transmitted through the broad band filter 16B is smaller than a standardized moving average value per unit transmission band width of the energy of the spectral line transmitted through the narrow band filter 16A. Therefore, a relation V1/W1>V2/W2 holds. The difference V between V1/W1 and V2/W2 is larger when the band width of the broad band filter is greater.

It can be appreciated from the above that the difference of the standardized moving average values, in the case of that the transmission band width of the broad band filter and the transmission band width of the narrow band filter are equal to each other, is different for a case of the continuous spectrum and a case of the line spectrum, and, on the basis of this difference, ordinary external light having a continuous spectrum, such as solar light and artificial light, can be distinguished from the flame having the line spectrum.

Both when only the line spectrum is present and when the line spectrum and continuous spectrum are present together, the relation V≧Vo holds so long as the line spectrum of the flame is present.

Therefore, in the present embodiment, the standardized moving average value V2 obtained from the infrared ray transmitted through the broad band filter 16B is converted to a standardized moving average value based on the transmission band of the narrow band filter 16A, by the transmission band of the narrow band filter being as reference. Namely, the converted value is (W1·V2)/W2=V2/n. The difference is calculated by the following formula.

$$V = V1 - V2/n \qquad (1)$$

Also, the difference V is calculated by the following formula.

$$V = V1/W1 - V2/W2 \qquad (2)$$

$$V = n \cdot V1 - V2 \qquad (3)$$

In the formula (2), the difference V is obtained such that each of the standardized moving average values is converted to a value on the basis of unit transmission band. In the formula (3), the difference V is obtained such that the standardized moving average value V1 obtained from the infrared ray transmitted through the narrow band filter 16A is converted to a standardized moving average value on the basis of the transmission band of the broad band filter 16B, by the transmission band of the broad band filter being as reference.

In next step 106, V2/V1 is calculated. Namely, a ratio of the standardized moving average value V2 obtained by the infrared ray transmitted through the broad band filter 16B with respect to the standardized moving average value V1 obtained by the infrared ray transmitted through the narrow band filter 16A, is calculated. As described before, the ratio, that is, V2/V1 is substantially equal to 1 when a line spectrum of carbonic acid gas resonance radiation generated by a flame is incident, and V2/V1 is equal to n, that is, the ratio of the transmission band widths, when a continuous spectrum is incident. Accordingly, V2/V1 is a value represented by the following formula.

$$1 \leq V2/V1 \leq n \qquad (4)$$

In next step 108, it is judged whether or not the difference V is equal to or more than a predetermined value Vo (this value depends on formula (1), (2), (3)), and the ratio V2/V1 satisfies above formula (4). When the determination of the step 108 is affirmative, the flame is detected (judged) in step 110, and a signal is outputted to the alarm circuit 24 so as to raise an alarm.

Instead of the above formula (4), the following formula (5) can be used. Namely, V1/V2, that is, a ratio of the standardized moving average value V1 obtained from the infrared ray transmitted through the narrow band filter 16A with respect to the standardized moving average value V2 obtained from the infrared ray transmitted through the broad band filter 16B, can be calculated.

$$1 \leq V1/V2 \geq 1/n \qquad (5)$$

In the above description, the example in which a digital circuit formed by the microcomputer is used is explained. However, an analog circuit can be used.

Figure 6:
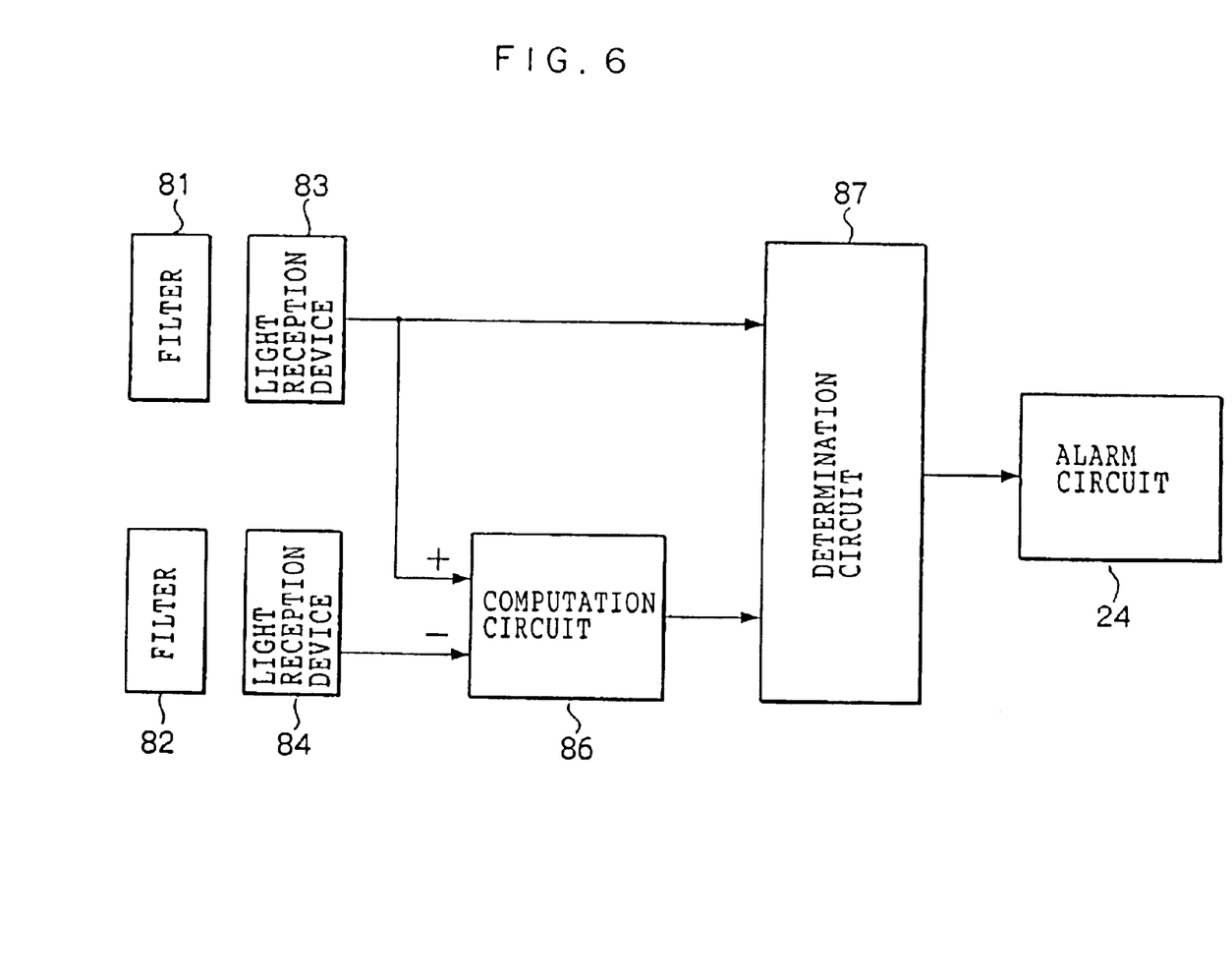
FIG. 6 is a block diagram showing a flame determining device of a second embodiment of the present invention.

FIG. 6 is a conceptual structural view showing a second embodiment of the present invention. In FIG. 6, reference numeral 81 in FIG. 6 donates a band-pass filter that allows all frequencies within a transmission band to pass equally. Reference numeral 82 denotes filter that blocks only a band of resonance radiation of the carbonic acid gas and has a transmission band which is substantially the same as that of the filter 81. Reference numerals 83 and 84 denote light reception elements. Reference numeral 86 denotes a calculating circuit for computing a difference between intensity of the spectrum transmitted through the filter 81 and intensity of the spectrum transmitted through the filter 82. The difference of the intensities of the spectrums transmitted through the filters 81 and 82 corresponds to the electric signal outputted from the light reception element 14A in the first embodiment.

The light reception element 83 and the calculating circuit 86 are connected to a determining circuit 87 which judges in the same way of the determining circuit 22C in the first embodiment. An alarm circuit 24 which raise an alarm when the flame is detected (judged) is connected to the determining circuit 87. Note that explanation of the amplifier is omitted.

Figures 7, 7A:
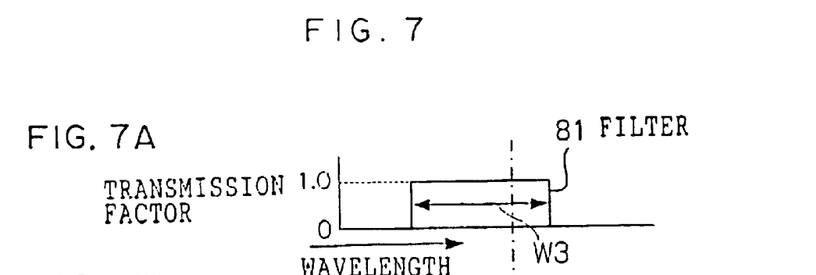
FIG. 7A is a diagram showing a characteristic of a filter used in a second embodiment of the present invention.
Figure 7B:
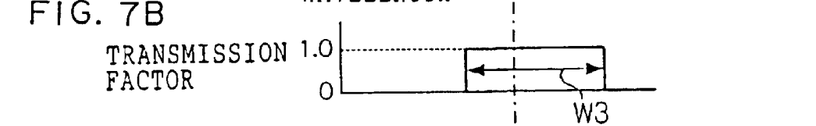
FIG. 7B is a diagram showing a characteristic of a filter used in the second embodiment of the present invention.
Figure 7C:
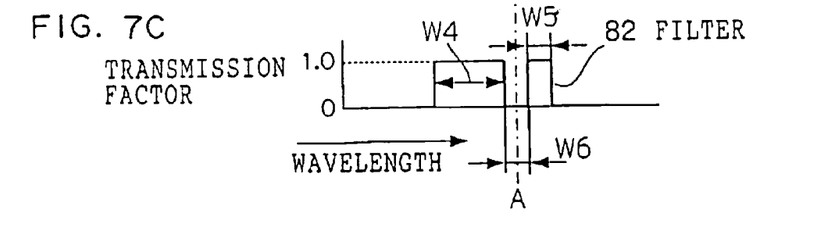
FIG. 7C is a diagram showing a characteristic of a filter used in the second embodiment of the present invention.

FIGS. 7A to 7C show transmission bandwidths of the filters 81 and 82. FIGS. 7A and 7B show transmission bandwidths of the filter 81 and FIG. 7C shows a transmission bandwidth of the filter 82. In FIGS. 7A and 7B, reference W3 denotes the transmission bandwidth of the filter 81, and in FIG. 7C, references W4 and W5 denote transmission bandwidths of the filter 82. W6 denotes a transmission block bandwidth (blocking band) sandwiched between the two transmission bandwidths. Either of the bandwidths shown in FIGS. 7A and 7B may be used for the transmission band width of the filter 81. Each band satisfies the relation W3=W4+W5+W6.

Symbol A represents a position of the spectral line of resonance radiation of the carbonic acid gas. The band center of the filter 81 is spaced apart by a predetermined wavelength difference from that of the filter 82. Since the band centers are thus spaced apart from each other by the predetermined wavelength difference, fabrication of the flame sensor is easier than if the band centers were coincident.

In the present embodiment, a flame can be detected like the first embodiment.

What is clamed is:

1. A flame sensor comprising:
   a narrow band filter for transmitting only light of a band corresponding to a line spectrum of carbonic acid gas resonance radiation generated by a flame;
   a broad band filter for transmitting light of a band which includes the band corresponding to the line spectrum and which is broader than the band corresponding to the line spectrum;
   a first light reception element for converting light transmitted through the narrow band filter to a first electric signal;
   a second light reception element for converting light transmitted through the broad band filter to a second electric signal; and
   a judging section performed by one of (A)–(C):
   (A) converting a value corresponding to an intensity of the first electric signal to a first value obtained by assuming that the light is transmitted through a band which is the same as the band of the broad band filter;
   (B) converting a value corresponding to an intensity of the second electric signal to a second value obtained by assuming that the light is transmitted through a band which is the same as the band of the narrow band filter; or
   (C) converting the value corresponding to the intensity of the first electric signal and the value corresponding to the intensity of the second electric signal to third and fourth values which are values per unit transmission band, and
   in a case of the (A), if a difference between the first value and the value corresponding to the intensity of the second electric signal is equal to or greater than a predetermined value and a ratio between the value corresponding to the intensity of the first electric signal and the value corresponding to the intensity of the second electric signal is within a predetermined range, the judging section judging that there is flame;

in a case of the (B), if a difference between the value corresponding to the intensity of the first electric signal and the second value is equal to or greater than a predetermined value and a ratio between the value corresponding to the intensity of the first electric signal and the value corresponding to the intensity of the second electric signal is within a predetermined range, the judging section judging that there is flame;

in a case of the (C), if a difference between the third value and the fourth value is equal to or greater than a predetermined value and a ratio between the value corresponding to the intensity of the first electric signal and the value corresponding to the intensity of the second electric signal is within a predetermined range, the judging section judging that there is a flame.

2. A flame sensor according to claim 1, wherein the value corresponding to the intensity of the second electric signal and the value corresponding to the intensity of the first electric signal is a moving average value of intensities of electric signals at a range shorter than a predetermined range which is referenced by a moving average value of intensities of electric signals at the predetermined range.

3. A flame sensor according to claim 2, wherein the moving average value is calculated on the basis of the flicker component of light from the flame included in electric signal.

4. A flame sensor according to claim 1, wherein the first value is obtained such that the value corresponding to an intensity of the first electric signal is converted on the basis of a ratio of a band width of the broad band filter with respect to a band width of the narrow band filter; and the second value is obtained such that the value corresponding to an intensity of the second electric signal is converted on the basis of a ratio of the band width of the narrow band fitter with respect to the band width of the broad band filter.

5. A flame sensor comprising:

a first blocking filter for blocking light in an infrared ray region;

a second blocking filter which is disposed at a light transmitted side of the first blocking filter so as to block stray light;

a narrow band filter which is disposed at a light transmitted side of the second blocking filter and which transmits only light of a band corresponding to a line spectrum of carbonic acid gas resonance radiation generated by a flame;

a broad band filter which is disposed at the light transmitted side of the second blocking filter and which transmits light of a band which includes the band corresponding to the line spectrum and which is broader than the band corresponding to the line spectrum;

a first light reception element for converting light transmitted through the narrow band filter to a first electric signal; and a second light reception element for converting light transmitted through the broad band filter to a second electric signal.

6. A flame sensor according to claim 5, wherein the first blocking filter, the second blocking and the narrow band filter is formed by a thin plate made of one of silicon and germanium and the broad band filter is formed by a thin plate made of sapphire.

7. A flame sensor according to claim 6 further comprising a judging section for determining whether or not a difference obtained by subtracting a value corresponding to an intensity of the second electric signal from a value corresponding to an intensity of the first electric signal is within a predetermined range, with the value corresponding to the intensity of the second electric signal and the value corresponding to the intensity of the first electric signal being obtained by assuming that a transmission band width of the broad band filter and a transmission band width of the narrow band filter are equal to each other.

8. A flame sensor according to claim 7, wherein the value corresponding to the intensity of the second electric signal and the value corresponding to the intensity of the first electric signals at a range shorter than a predetermined range which is referenced by a moving average value of intensities of electric signals at the predetermined range.

9. A flame sensor according to claim 5 further comprising a judging section for determining whether or not a difference obtained by subtracting a value corresponding to an intensity of the second electric signal from a value corresponding to an intensity of the first electric signal is equal to or greater than a predetermined value, and a ratio between the value corresponding to the intensity of the second electric signal and the value corresponding to the intensity of the first electric signal is within a predetermined range, with the value corresponding to the intensity of the second electric signal and the value corresponding to the intensity of the first electric signal being obtained by assuming that a transmission band width of the broad band filter and a transmission band width of the narrow band filter are equal to each other.

10. A flame sensor according to claim 9, wherein the value corresponding to the intensity of the second electric signal and the value corresponding to the intensity of the first electric signal is a moving average value of intensities of electric signals at a range shorter than a predetermined range which is referenced by a moving average value of intensities of electric signals at the predetermined range.

11. A flame sensor comprising:

a first filter having a predetermined band for transmitting light, a blocking band for blocking only light of a band corresponding to a line spectrum of carbonic acid gas resonance radiation generated by a flame being formed within the predetermined band;

a second filter having a band width substantially the same as that of the predetermined band for transmitting light of a band including the band corresponding to the line spectrum;

a first light reception element for converting light transmitted through the first filter to a first electric signal;

a second light reception element for converting light transmitted through the second filter to a second electric signal; and a judging section performed by one of (A)–(C)

(A) converting an intensity difference between a value corresponding to an intensity of the first electric signal and a value corresponding to an intensity of the second electric signal to a first value obtained by assuming that the light is transmitted through a band which is the same as the band of the second band filter, (B) converting the value corresponding to the intensity of the second electric signal to the second value obtained by assuming that the light is transmitted through a band which is the same as the blocking band, or (C) converting the intensity difference and the value corresponding to the intensity of the second electric signal to third and fourth values which are values per unit transmission band, and in a case of the (A), if a difference between the first value and the value corresponding to the intensity of the second electric signal is equal to or greater than a predetermined value and a ratio between the intensity difference and the value corresponding to the intensity of the second electric signal is within a predetermined range, the judging section judging that there is flame, in a case of the (B), if a difference between the intensity difference and the second value is equal to or greater than a predetermined value and a ratio between the intensity difference and the value corresponding to the intensity of the second electric signal is within a predetermined range, the judging section judging that there is flame, in a case of the (C), if a difference between the third value and the fourth value is equal to or greater than a predetermined value and a ratio between the intensity difference and the value corresponding to the intensity of the second electric signal is within a predetermined range, the judging section judging that there is flame.

12. A flame sensor according to claim 11, wherein the value corresponding to the intensity of the second electric signal and the value corresponding to the intensity of the first electric signal is a moving average value of intensities of electric signals at a range shorter than a predetermined range which is referenced by a moving average value of intensities of electric signals at the predetermined range.

13. A flame sensor according to claim 11, wherein the first value is obtained such that the intensity difference is converted on the basis of a ratio of a band width of the second band filter with respect to a band width of the blocking band; and the second value is obtained such that the value corresponding to an intensity of the second electric signal is converted on the basis of a ratio of the band width of the blocking band with respect to the band width of the second band filter.

14. A flame sensor comprising:

a first blocking filter for blocking light in an infrared ray region;

a second blocking filter which is disposed at a light transmitted side of the first blocking filter so as to block stray light;

a first filter having a predetermined band for transmitting light, a blocking band for blocking only light of a band corresponding to a line spectrum of carbonic acid gas resonance radiation generated by a flame being formed within the predetermined band;

a second filter having a band width substantially the same as that of the predetermined band, for transmitting light of a band including the band corresponding to the line spectrum;

a first light reception element for converting light transmitted through the first band filter to a first electric signal; and a second light reception element for converting light transmitted through the second band filter to a second electric signal.

15. A flame sensor according to claim 14, wherein the first blocking filter, the second blocking filter and the narrow band filter is formed by a thin plate made of one of silicon and germanium and the broad band fitter is formed by a thin plate made of sapphire.

16. A flame sensor according to claim 15, further comprising a judging section for determining whether or not a difference obtained by subtracting a value corresponding to an intensity of the second electric signal from a difference which is obtained by subtracting a value corresponding to an intensity of the first electric signal from the value corresponding to the intensity of the second electric signal is equal to or greater than a predetermined value, and a ratio between the value corresponding to the intensity of the first electric signal and said difference is within a predetermined range, with the value corresponding to the intensity of the second electric signal and the value corresponding to the intensity of the first electric signal being obtained by assuming that a blocking band width of the first filter and a transmission band width of the second filter are equal to each other.

17. A flame sensor according to claim 16, wherein the value corresponding to the intensity of the second electric signal and the value corresponding to the intensity of the first electric signal is a moving average value of intensities of electric signals at a range shorter than a predetermined range which is referenced by a moving average value of intensities of electric signals at the predetermined range.

18. A flame sensor according to claim 14, further comprising a judging section for determining whether or not a difference obtained by subtracting a value corresponding to an intensity of the electric signal from a difference which is obtained by subtracting a value corresponding to an intensity of the first electric signal from the value corresponding to the intensity of the second electric signal is equal to or greater than a predetermined value, and a ratio between the value corresponding to the intensity of the first electric signal and said difference Is within a predetermined range, with the value corresponding to the intensity of the second electric signal and the value corresponding to the intensity of the first electric signal being obtained by assuming that a blocking band width of the first filter and a transmission band width of the second filter are equal to each other.

19. A flame sensor according to claim 18, wherein the value corresponding to the intensity of the second electric signal and the value corresponding to the intensity of the first electric signal is a moving average value of intensities of electric signals at a range shorter than a predetermined range which is referenced by a moving average value of intensities of electric signals at the predetermined range.

* * * * *